United States Patent [19]

Vines

[11] Patent Number: 5,191,766
[45] Date of Patent: Mar. 9, 1993

[54] HYBRID INTERNAL COMBUSTION/STEAM ENGINE

[76] Inventor: Frank L. Vines, 607 Columbiana Rd., Birmingham, Ala. 35209

[21] Appl. No.: 712,569

[22] Filed: Jun. 10, 1991

[51] Int. Cl.[5] .................... F02G 3/02; F02G 5/02; B60K 3/04; B60K 6/12
[52] U.S. Cl. .................... 60/619; 180/301; 180/304
[58] Field of Search ............. 60/619, 310; 180/301, 180/303, 304, 310

[56] References Cited

U.S. PATENT DOCUMENTS

| | | |
|---|---|---|
| 980,382 | 1/1911 | Willis .................... 180/301 X |
| 1,147,280 | 7/1915 | Thomas .................... 60/619 |
| 1,152,361 | 8/1915 | Thomas .................... 60/619 |
| 1,373,509 | 4/1921 | Killman . |
| 1,496,839 | 6/1924 | Bohan et al. . |
| 2,490,418 | 12/1949 | Collins et al. .................... 180/304 X |
| 2,596,468 | 5/1952 | Harris et al. .................... 180/304 X |
| 2,737,014 | 3/1956 | Bush . |
| 3,339,663 | 6/1964 | Anderson . |
| 3,672,048 | 6/1972 | Conwell . |
| 3,979,913 | 9/1976 | Yates . |
| 4,087,974 | 3/1978 | Vaughan . |
| 4,300,353 | 11/1981 | Ridgway . |
| 4,402,182 | 9/1983 | Miller . |
| 4,406,127 | 9/1983 | Dunn . |
| 4,433,548 | 2/1984 | Hallstrom, Jr. . |
| 4,442,673 | 4/1984 | Haworth . |
| 4,590,766 | 3/1986 | Striebich . |
| 4,706,462 | 11/1987 | Soltermack . |

FOREIGN PATENT DOCUMENTS

| | | | |
|---|---|---|---|
| 3020308 | 12/1981 | Fed. Rep. of Germany ........ 60/619 |
| 2502692 | 10/1982 | France .................... 60/619 |
| 207608 | 11/1923 | United Kingdom .................... 60/619 |

OTHER PUBLICATIONS

"Energy Saving Ship Propulsion System," *Diesel and Gas Turbine Worldwide*, vol. XIII, No. 9, p. 37 (Nov. 1981).

"Hybrid Diesel Power Plant," *Diesel and Gas Turbine Worldwide*, p. 44 (Dec. 1982).

*Primary Examiner*—Michael Koczo
*Attorney, Agent, or Firm*—Jennings, Carter, Thompson & Veal

[57] ABSTRACT

A hybrid engine is disclosed which utilizes the heat from the exhausted combustion gases of an internal combustion engine to generate steam externally of the cylinders of the engine. The steam is used to power turbines which may be effectively connected to augment the power supplied by the internal combustion engine or to act as a power transfer medium. The device includes a modified exhaust manifold which incorporates one way valves and water injection ports to enable steam pressurization within the manifold. Steam spent in the turbines is condensed and returned to the system with exhaust gases being vented to atmosphere subsequent to the utilization of their previously wasted heat energy for power production.

28 Claims, 15 Drawing Sheets

HYBRID INTERNAL COMBUSTION/STEAM ENGINE

FIELD OF THE INVENTION

This invention relates generally to internal combustion engines modified to increase the efficiency of the engines. More specifically this invention pertains to those internal combustion engines modified to utilize waste heat of the combustion engine to generate steam that is transformed to power to augment the power output of the engine.

BACKGROUND OF THE INVENTION

There have been various attempts to utilize the waste heat generated by internal combustion engines. Inventions known in the prior art utilize the hot combustion exhaust emitted from the cylinder of an engine to heat a reservoir of water in order to generate steam. The steam is then directed to a steam turbine, cylinder or engine that converts the steam to power; thereby, supplementing the power output of the engine.

Waste heat generated by internal combustion engines is vented to the atmosphere by two primary means and one secondary means. The major primary means of heat venting is the very rapid venting of the hot exhaust gases into the atmosphere via the exhaust pipe. The other primary means of heat venting is via conduction and convection from the radiator in a liquid cooled engine, or from the cooling fins of an air cooled engine. The secondary means is from conduction and convection from the engine itself along with its associated components.

Inventions known in the prior art share one fundamental flaw in their designs. That is their inability to utilize a substantial percentage of the waste heat for steam or power production, due to the very rapid egress of the hot exhaust gases through the exhaust system and out the exhaust pipe. Conduction and convection heat transfer is so slow even through a good heat conducting material that the large majority of the waste heat is vented out the exhaust pipe. In no instance in inventions known in the prior art is water or other liquid injected directly into the hot exhaust gases.

Water injected directly into the super hot exhaust gases exiting the engine cylinder confined under pressure within a modified exhaust manifold results in an explosive expansion of steam pressure buildup similar in magnitude and duration to the explosive expansion of gases within the engine cylinder during the fuel burn of the power stroke of the engine. This steam power generation is independent of and in addition to the power generated by the fuel burn within the engine cylinder.

In U.S. Pat. No. 4,433,548 the water injection does not go into the exhaust. At the end of the exhaust stroke all of the hot exhaust has already vented into the exhaust manifold and the exhaust valve has closed. The water injection is made into the steam generation chamber which is in reality a one-way valve protected extension of the cylinder's combustion chamber. The heat energy being utilized for steam production is the residual heat retained within the combustion chamber and its steam generation chamber extension from the prior fuel burn during the power stroke. This patent is using the hot exhaust energy only to preheat the water for water injection.

This patent also fails to mention any means of shutting off the fuel intake during this "second power stroke" or any means of keeping the cam operated regular intake valve closed during this "second power stroke", i.e., the regular intake stroke. In fact, the steam generated would blow back out the open intake valve, into the intake manifold and back into the carburetor.

U.S. Pat. No. 4,406,127 generates steam by injecting water onto the surface of an exhaust manifold which is surrounded by a chamber. A steam cylinder is connected to the chamber converting steam into power.

SUMMARY OF THE INVENTION

It is the primary object of the present invention to provide a hybrid internal combustion/steam engine that utilizes waste heat to generate steam under pressure to augment the power produced by the fuel burn of the engine. The steam is generated by the direct mixture of water with the hot combustion gases discharged from an engine cylinder.

Yet another object is to provide such a hybrid engine that utilizes the exhaust manifold as a steam generator and as the primary engine cooling device.

Another object is to improve the efficiency of the internal combustion engine by generating and transporting the steam under pressure through a system which utilizes steam turbines to convert the steam to power.

Still another object is to provide such a device that condenses the steam from the exhaust/steam mixture to restore the water supply and retain harmful combustion products that may be vented into the atmosphere.

Yet another object is to provide the engine with controls and operative mechanisms to power the operation of a vehicle.

These and other objects and advantages are achieved through the use of an internal combustion engine having a plurality of cylinders with pistons therein and an exhaust port contiguous with each cylinder. The engine also includes an exhaust manifold that is cooperatively connected with the exhaust port of each cylinder of the combustion engine. The exhaust manifold is modified so steam may be generated under pressure therein. Each exhaust port of the engine is modified with a pressure activated one-way valve to prevent water/steam blow back into the combustion chamber of the engine. The engine further includes a means connected to the exhaust manifold by which water is injected adjacent each exhaust port concurrently with the end of the exhaust stroke and at the end of the compression stroke of each piston so water is directly mixed with the discharged hot combustion exhaust to generate a hot pressurized volume of exhaust/steam within the exhaust manifold.

A pressurized exhaust/steam power take-off system utilizes pressurized conduits to direct the volume of hot exhaust/steam generated in the exhaust manifold to work-producing steam turbines. Spent exhaust/steam exiting from the turbines is then guided to a tank condenser having a water reservoir where the steam is condensed thus resupplying the reservoir. Exhaust is vented from the condenser and into the atmosphere. Also, harmful by-products of the internal combustion are retained in the water and prevented from being vented into the atmosphere.

BRIEF DESCRIPTION OF THE DRAWINGS

Apparatus embodying features of my invention are depicted in the accompanying drawings which form a part of this disclosure and wherein.

DESCRIPTION OF PREFERRED EMBODIMENT

Figure 1:
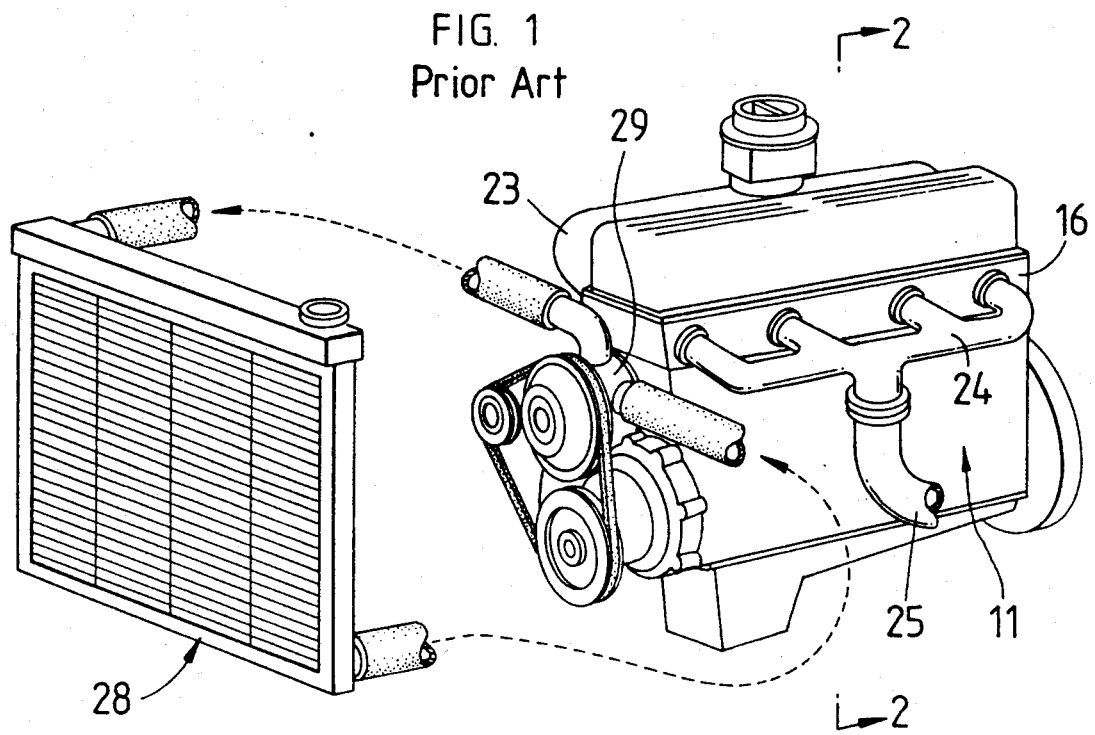
FIG. 1 is a perspective of a typical water cooled internal combustion engine.
Figure 2:
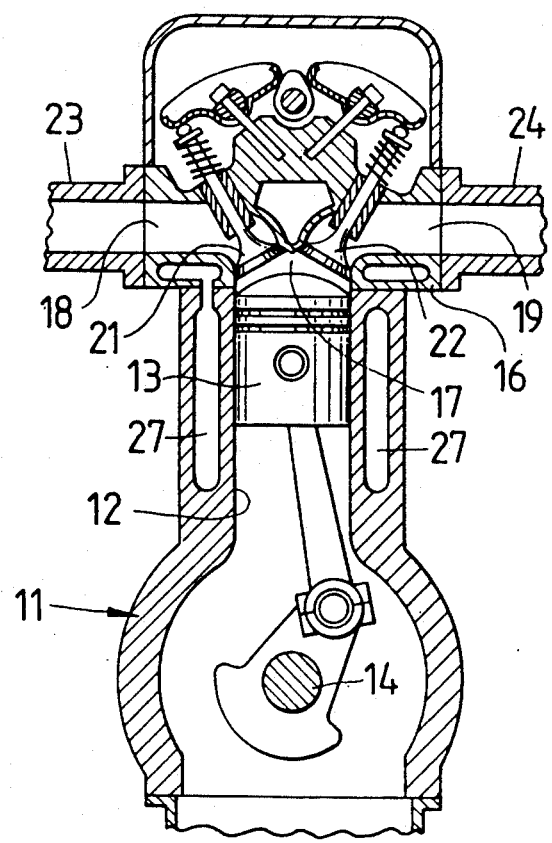
FIG. 2 is a cross sectional view taken along line 2—2 in FIG. 1.

Referring to the drawings for a clearer understanding of my invention, it may be seen that my apparatus may be utilized with the typical four stroke/cycle internal combustion engine that includes an engine block 11 housing a plurality of cylinders 12 with pistons 13 therein mounted to a crankshaft 14 as illustrated in FIGS. 1 and 2. A cylinder head 16 is cooperatively positioned over the cylinders 12 forming a combustion chamber 17 above each cylinder 12. An intake manifold 23 is mounted to one side of the cylinder head 16 and serves to direct a fuel/air mixture into the cylinder 12. An exhaust manifold 24 is mounted to the side of the cylinder head 16 opposite the intake manifold 23 and serves to direct combustion gases from the cylinder 12.

The combustion chamber 17 communicates with the intake manifold 23 through an intake port 18 having an intake valve 21 mounted therein that controls the flow of fuel into the combustion chamber 17. The combustion chamber 17 communicates with the exhaust manifold 24 via an exhaust port 19 having an exhaust valve 22 mounted therein that controls the flow of combustion exhaust discharged from the cylinder 12.

In the first or intake stroke, the piston is pulled downward by the crankshaft 14 and the fuel/air mixture is drawn into the cylinder 12 through the intake manifold 23, and past an open intake valve 21. In the second or compression stroke, both valves 21 and 22 are closed and the piston 13 moves upward compressing the fuel/air mixture. At the end of the compression stroke, the fuel/air mixture is ignited by a spark created by a spark plug (not shown) or by heat of compression in the diesel engine. The explosive expansion of the ignited fuel drives the piston downward in a power stroke and rotates the crankshaft 14.

The combustion exhaust created when the fuel is burned is discharged from the cylinder 12 when the piston 13 is pushed upward in the exhaust stroke. The combustion exhaust is vented past an open exhaust valve 22 and into the exhaust manifold 24 which directs the exhaust to an exhaust pipe 25 which in turn carries the exhaust to the atmosphere. The pistons are connected to the crankshaft 14 such that the downward, power stroke of one piston 13 causes the upward exhaust or compression stroke of another piston 13. When the engine is of the type used in vehicles, this rotary power may be directed through a transmission arrangement to a drive shaft and differential gear that turns the drive wheels.

The combustion of the fuel/air mixture and friction between the moving engine parts causes the engine to become heated. The engine is usually cooled by a system that includes water jackets 27 that course through the engine block 11 and surround the cylinders 12. The jackets 27 are connected to a radiator 28 and a water pump 29. The cooling system is closed and filled with a coolant liquid which is usually a mixture of water and antifreeze. The water pump 29 forces the liquid to flow between the jackets 27 and radiator 28 in order to carry away and dissipate the heat collected from the engine. The major control mechanism of heat build-up of the internal combustion engine is, however, the rapid venting of the exhaust gases to atmosphere.

Figure 3:
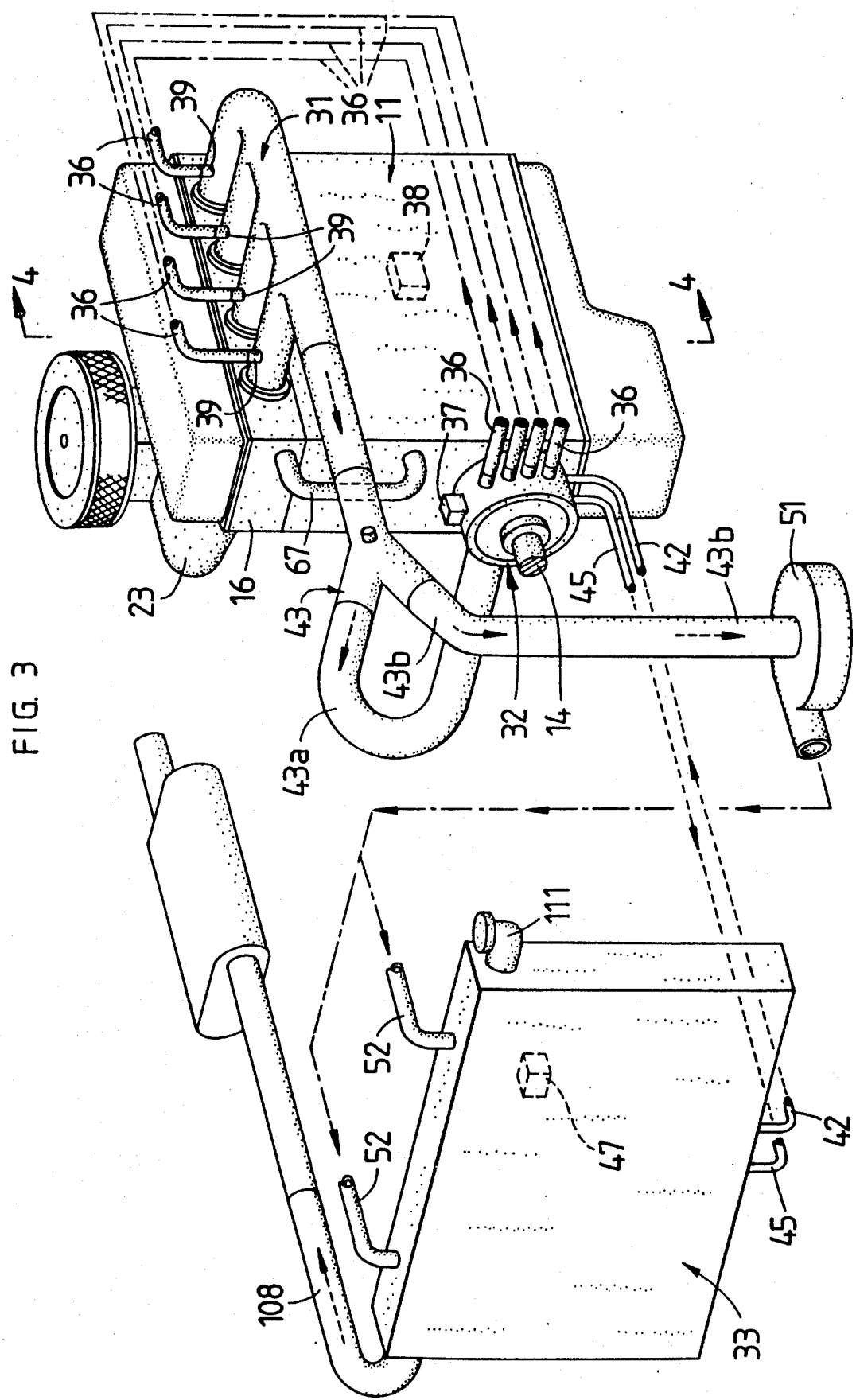
FIG. 3 is a perspective of my apparatus.

My invention, as shown in FIG. 3, has removed from it the radiator 28, water pump 29 and exhaust manifold 19. My hybrid engine utilizes a modified exhaust manifold 31 that serves as the steam generator and primary cooling means for the engine. The exhaust manifold 31 is mounted to the cylinder head 16 in cooperation with the exhaust port 19 of each cylinder 12. The engine further has a water injector 32 connected to the modified exhaust manifold 31 that injects a preselected volume of water into the modified manifold 31 adjacent the exhaust port 19 of each cylinder 12 and concurrently with the end of the exhaust stroke of a cylinder 12 of this four-cylinder engine that has just completed its exhaust stroke and the end of the compression stroke of each piston 13 mixing water directly with hot combustion exhaust to create a pressurized column of exhaust/steam. Water is supplied to the water injector 32 by means of a tank condenser 33 having a reservoir therein. My hybrid engine further includes a power take-off system that utilizes a steam turbine 51 to transfer the pressurized volume of exhaust/steam to power.

Figure 4:
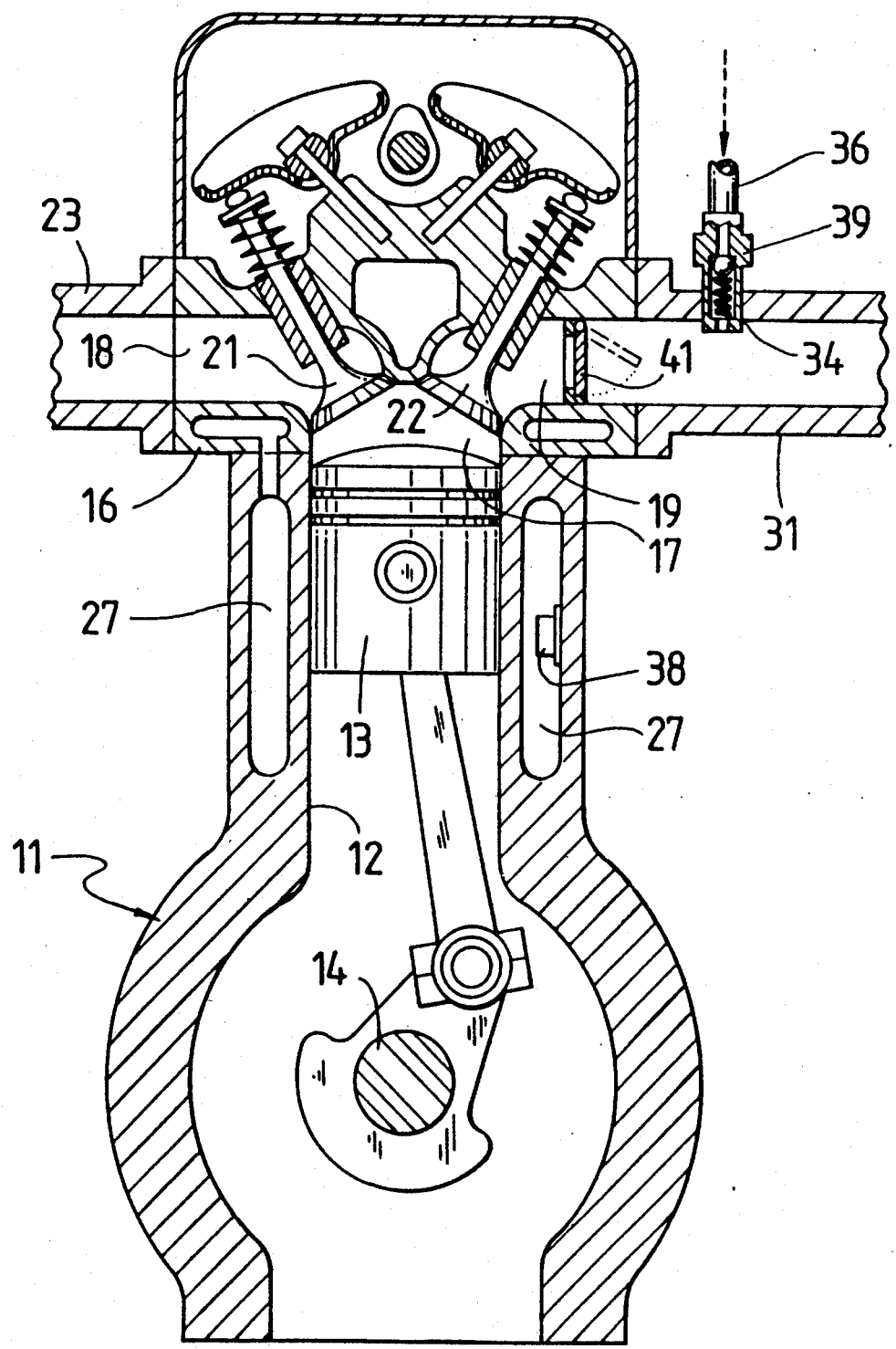
FIG. 4 is a sectional view taken of my hybrid engine taken along line 4—4 in FIG. 3.

The modified exhaust manifold 31 is constructed of an acid- and alkali-resistant material such as stainless steel, and is sufficiently pressure resistant to withstand the increased pressure exerted by the surge of steam generated therein. As shown in FIG. 4, a water injection port 34 is fabricated in the modified manifold 31 adjacent each exhaust port 19.

The water injector 32 is a multi-orifice high-pressure clutch-activated injector pump that receives its power from the crankshaft 14. Water is supplied to the injector 32 from the tank condenser 33 via an intake line 42. The water injector clutch is activated to engage by the electrical control mechanism 37 when both temperature sensors 38 and 47 exceed their preselected settings. The water injector clutch is disengaged by the electrical control mechanism 37 when either temperature sensor 38 or 47 falls below its preselected setting. Timing, time duration and secondarily water volume of the water injections into the modified exhaust manifold 31 at the end of the exhaust stroke and compression stroke of each piston 13 are controlled by crankshaft cams. Thus, it can be seen that the timing of the beginning of the water injection into the modified exhaust manifold 31 adjacent to each cylinder 12 is controlled by the rotational position of the crankshaft 14. The duration and secondarily the volume of each water injection are controlled by the radial arc of the crankshaft cam. There is one crankshaft cam for each water injection line 36.

The activation and deactivation of the control mechanism 37 is electrically controlled by a temperature sensor 38 mounted within the water jacket 27 and a temperature sensor 47 mounted within the tank condenser 33. The temperature sensor 38 is set at a temperature slightly below the optimum operating temperature of the engine. The temperature sensor 47 is set at a temperature slightly above the freezing point of water.

Figure 5:
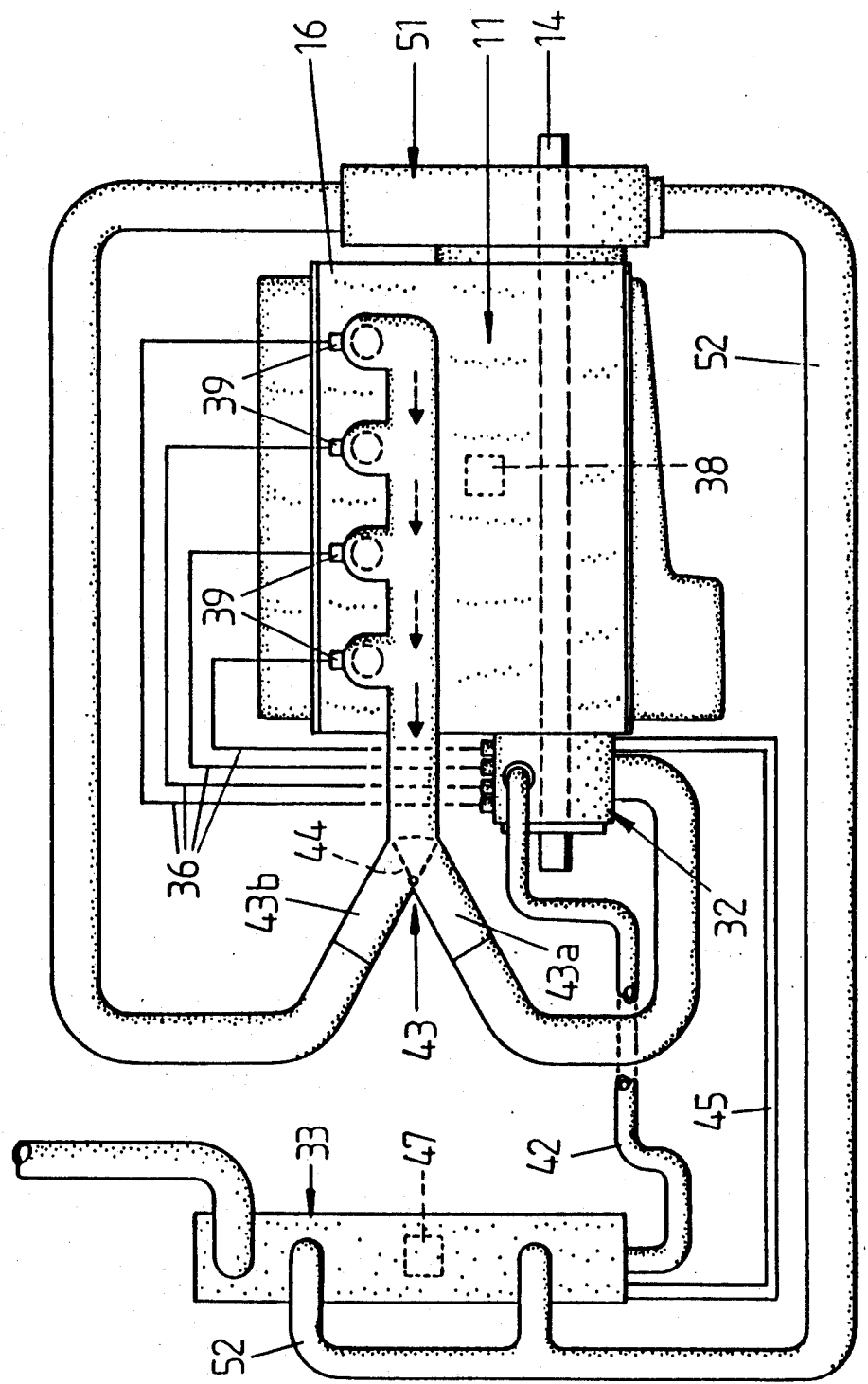
FIG. 5 is a schematic of a first embodiment of my hybrid internal combustion engine.

As further illustrated in FIGS. 4 and 5, a first spring-loaded pressure activated one-way valve 39 is mounted into the water injection port 34 and is positioned so as to prevent a back flush of steam into the tubing 36 and water injector 32. The one-way valve 39 functions similarly to those commonly used in valve stems of tires or hydraulic systems. The valve 39 is forced open by the hydraulic pressure from the water injector 32 timed to begin at the end of the exhaust stroke from only a cylinder 12 that has just completed its exhaust stroke and of the compression stroke of each piston 13 within this four-cylinder engine. The water injector 32 is constructed of such pumping strength that the hydraulic pressure generated exceeds the steam pressure build-up within the modified exhaust manifold 31. The valve 39 is forced closed almost instantly at the end of the water injection by the steam pressure build-up within the modified exhaust manifold 31. In this manner, steam is denied access to tubing 36 and water injector 32.

A second spring-loaded pressure activated one-way valve 41 is mounted within the exhaust port 19 of each cylinder 12 as shown in FIG. 4. Valve 41 may utilize the spring loaded gates as shown or similarly use the ball spring valve as shown from the first valve 39. The second one-way valve 41 is positioned to allow the discharge of combustion exhaust from the cylinder 12 during the exhaust stroke of the piston 13. At the same time the second one-way valve 41 prevents flow of the exhaust/steam back into the cylinder 12 during the intake, compression and power strokes of the engine. The practical effect of the placement of the valves 39 and 41 is to allow for a pressurized exhaust system. As a predetermined volume of water is injected adjacent each exhaust port 19 towards the end of the exhaust stroke of the piston 13, the exhaust/steam volume generated therein is prevented from being vented back into the tubing 36 and cylinder 12 thereby compressing the exhaust/steam volume within the modified manifold 31. The further practical effect of the placement of the valve 41 is to convert the four-cycle internal combustion engine into an air compressor with the power stroke of one cylinder of a multi-cylinder engine powering the air compressor via the exhaust stroke of another cylinder.

Not only does the modified exhaust manifold 31 serve as a steam generator, it also serves as the primary cooling device for the engine. As the water is converted from its liquid state to its gaseous state, the water absorbs heat generated by the engine. The volume of the water injections are preset to such an amount that not all of the water will be vaporized. The retention of any water in its liquid state within the modified exhaust manifold will assure a controlled residual temperature within the modified exhaust manifold. After the completion of the power stroke in each four-stroke cycle, the temperature of the engine will not greatly exceed the boiling point of water thereby maintaining a safe optimal operating temperature for the engine.

The secondary cooling system utilizes a connective tube 67, shown in FIG. 3, that is mounted to the former radiator connections creating a closed system. The connective tube 67 has a coolant filler tube with a radiator-type pressure cap and an overflow tube and tank that are not shown. This coolant filler tube is positioned on the upper level of traverse of the connective tube 67. The primary function of the coolant within this arrangement is the even heat dispersal within the engine. Slow circulation of the coolant within this closed system will occur due to convection currents set up within the coolant between the hot and cool portions of the coolant in the engine water jackets 27 during operation. A small amount of engine cooling will occur during operation due to conduction and convection heat loss from the engine block water jacket 27 and its connective tubing 67.

Figure 7:
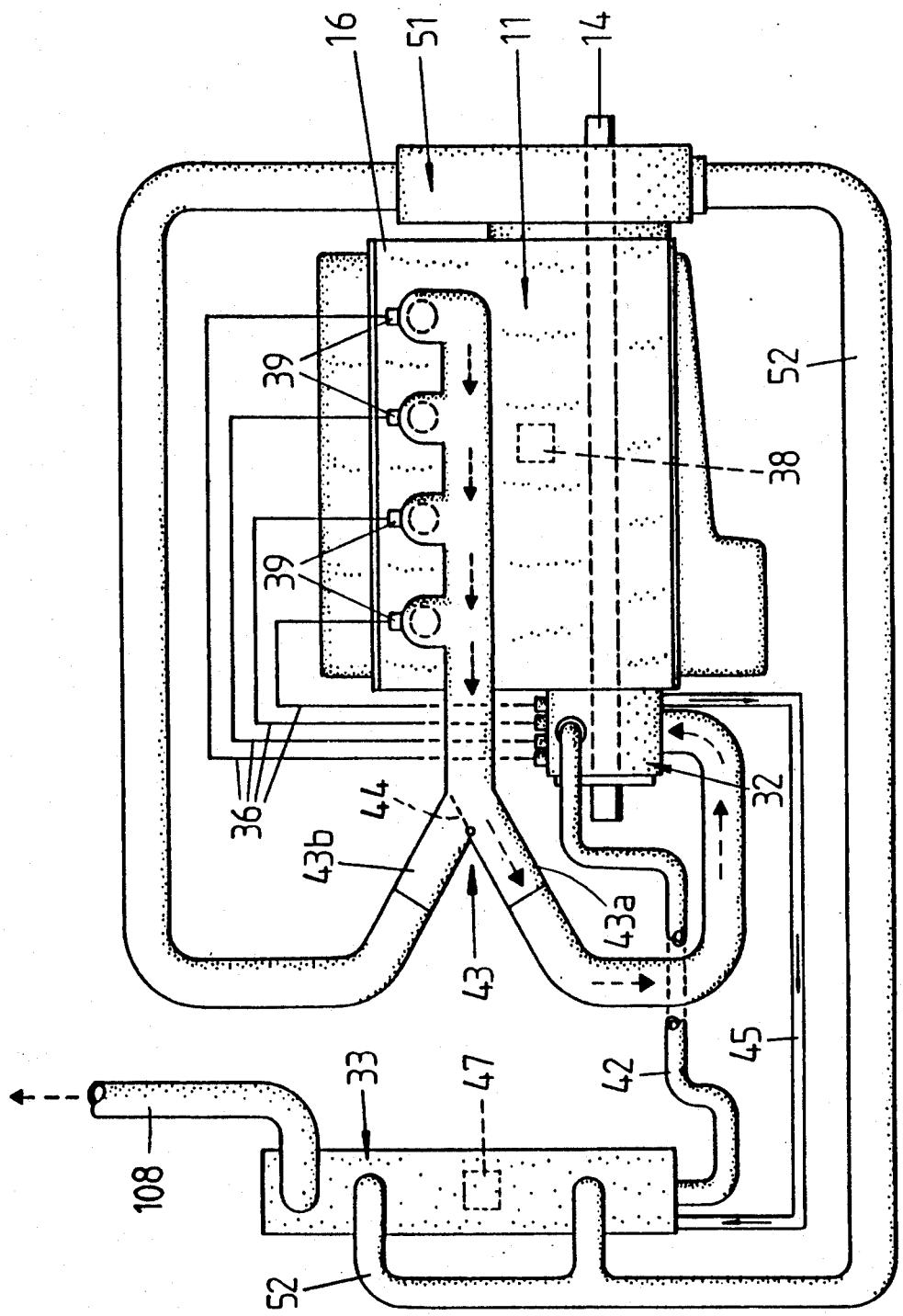
FIG. 7 is a schematic of the first embodiment of my hybrid internal combustion engine showing the route of flow of the column of unpressurized hot exhaust when the water in the tank condenser is frozen.
Figure 8:
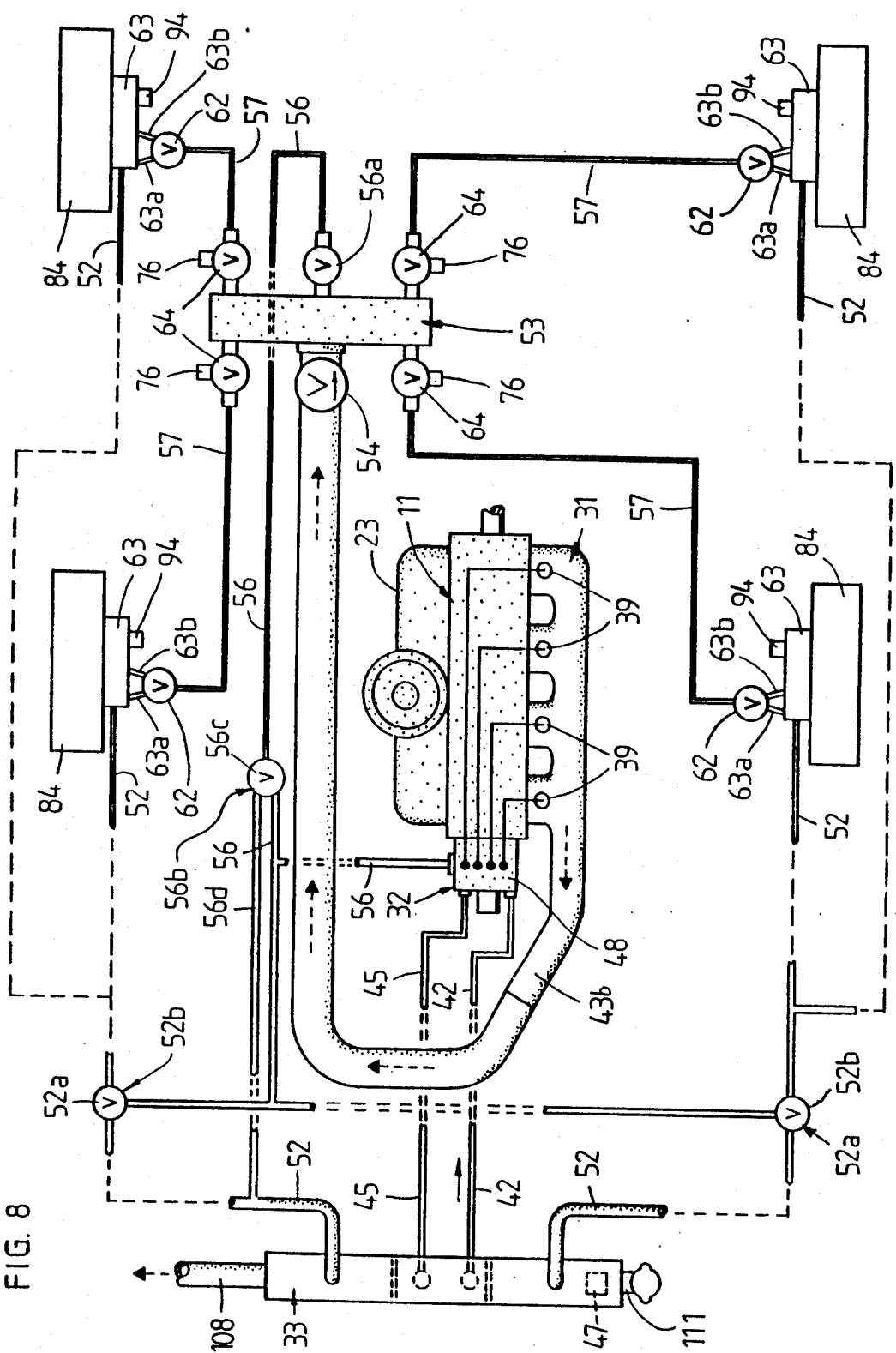
FIG. 8 is a schematic of the second embodiment of my invention.
Figure 9:
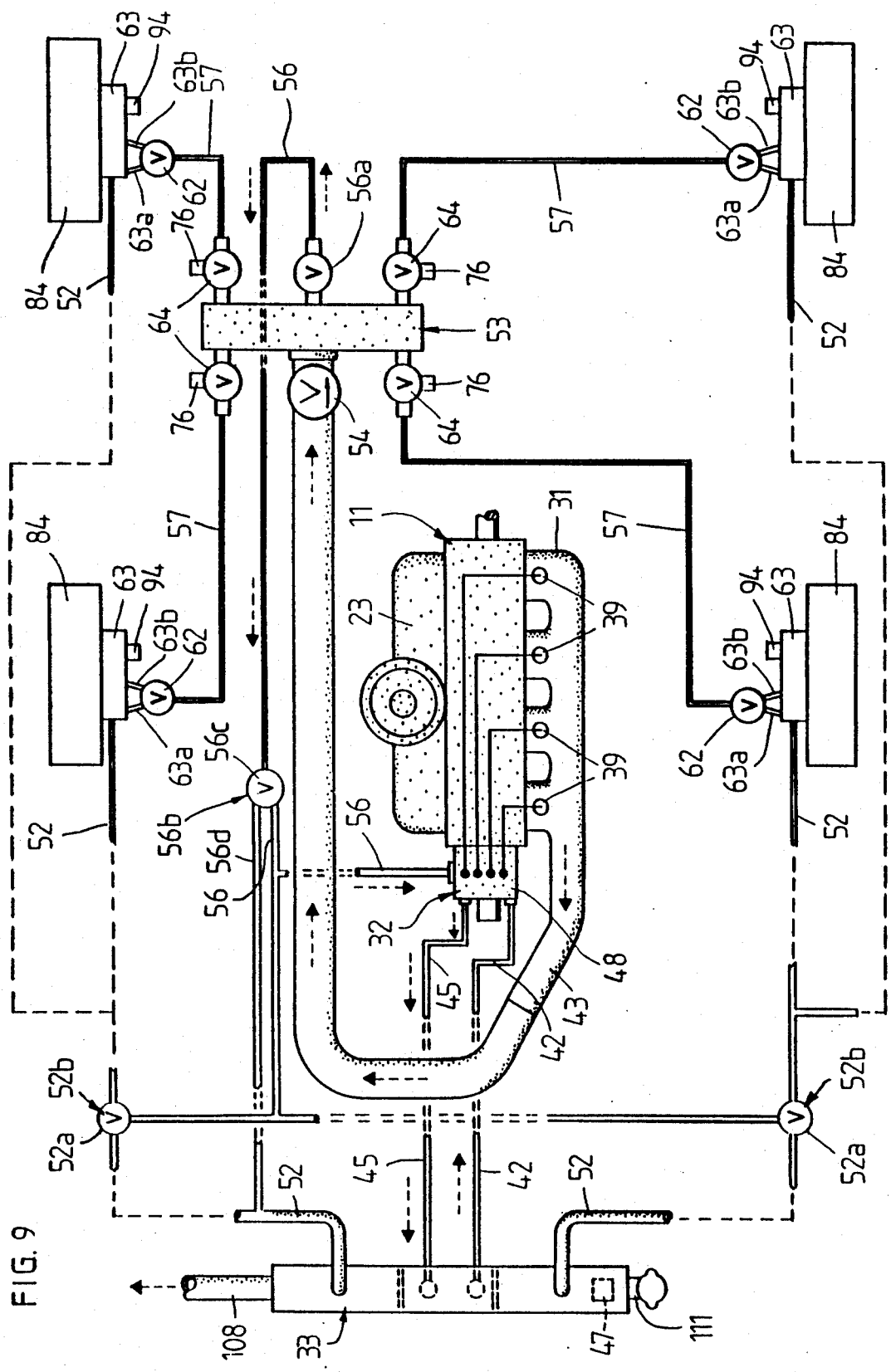
FIG. 9 is a schematic of the second embodiment showing the route of flow of the hot unpressurized exhaust when the water in the tank condenser is frozen and the "gear shift" lever is in neutral.
Figure 10:
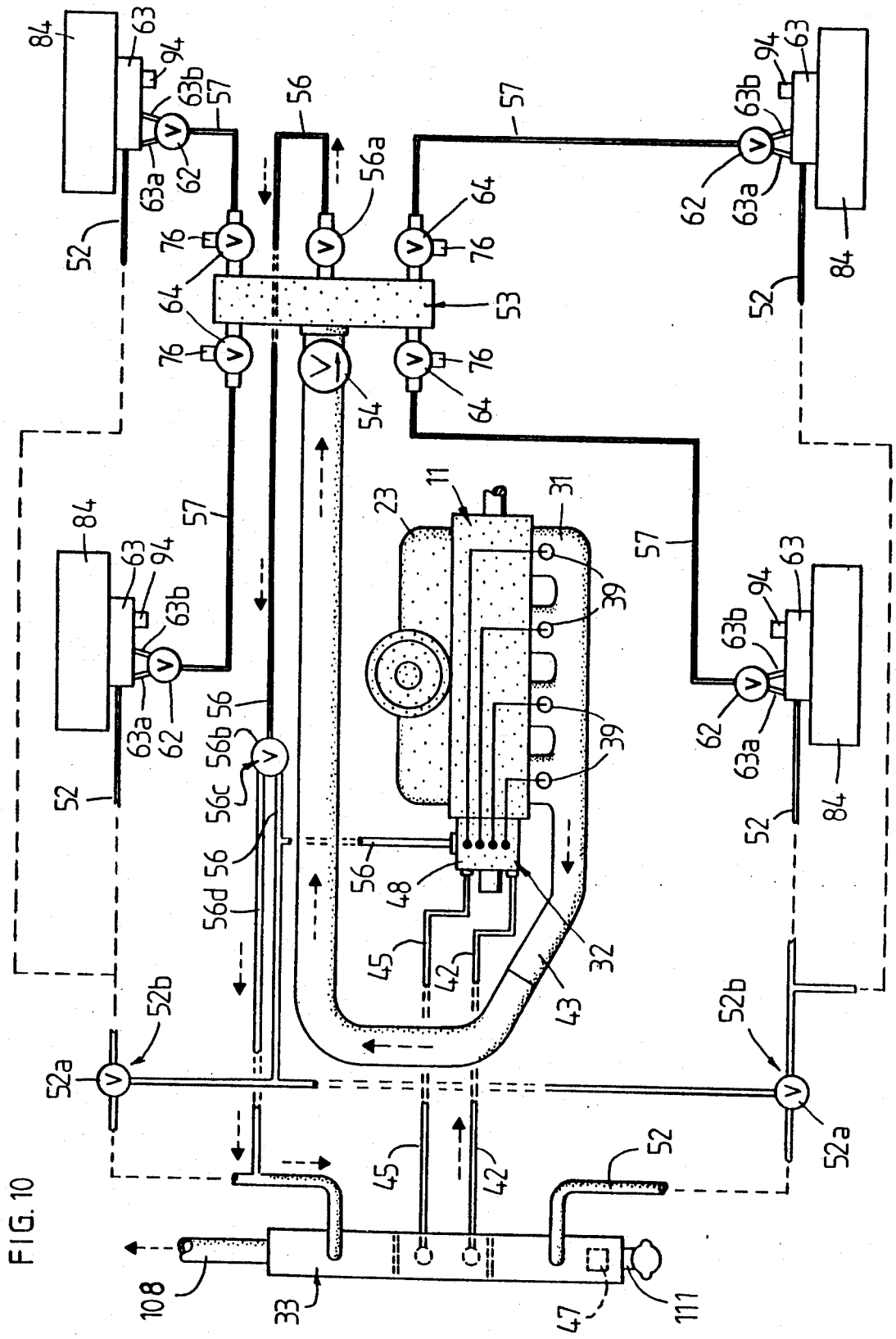
FIG. 10 is a schematic of the second embodiment showing the route of flow of the lightly pressurized column of exhaust/steam when the water in the tank condenser is well above the freezing point and the "gear shift" lever is in neutral—i.e., normal operation.
Figure 17:
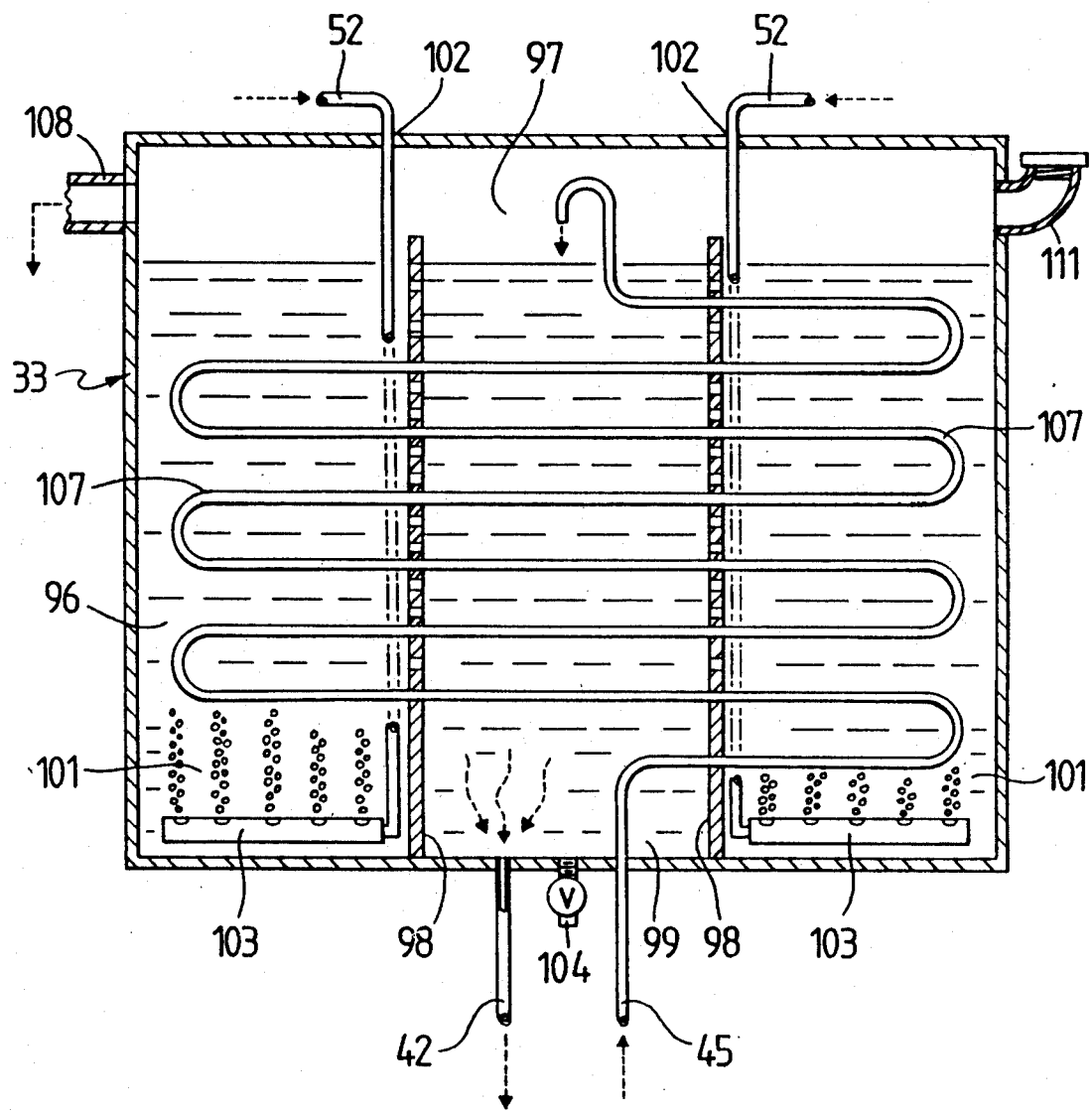
FIG. 17 is a cross-sectional view of the tank condenser along line 12—12 of FIG. 3.

As further illustrated in FIGS. 3 and 5, one end of the modified exhaust manifold 31 communicates with a single exit conduit 43 that has a Y-yoke therein providing two conduits 43a and 43b for the pressurized exhaust/steam column exiting the column from the manifold 31. A flow control diverter valve 44 is mounted within the Y-yoke. The movement of the valve is operated by a control arm that may be actuated by an electromagnet that is energized by a thermostat 47 mounted within the tank condenser 33. The thermostat 47 is set to make electrical contact with the electromagnet to actuate the diverter valve 44 so the hot high pressure volume of exhaust/steam exiting the modified manifold 31 is directed to the first exit conduit 43a when the thermostat 47 reads below a predetermined setting slightly above the freezing point of water. The first exit conduit 43a directs the hot exhaust to a shroud 48 surrounding the water injector 32 and then on to the tank condenser 33 via line 45 as shown in FIGS. 3, 7 and 17 heating the water within the system to a point above the designated temperature. This is especially necessary after an evening of severe sub-freezing weather and the water has frozen. Note the vehicle may be driven on the internal combustion engine alone until the water has been heated above the designated temperature.

Figure 6:
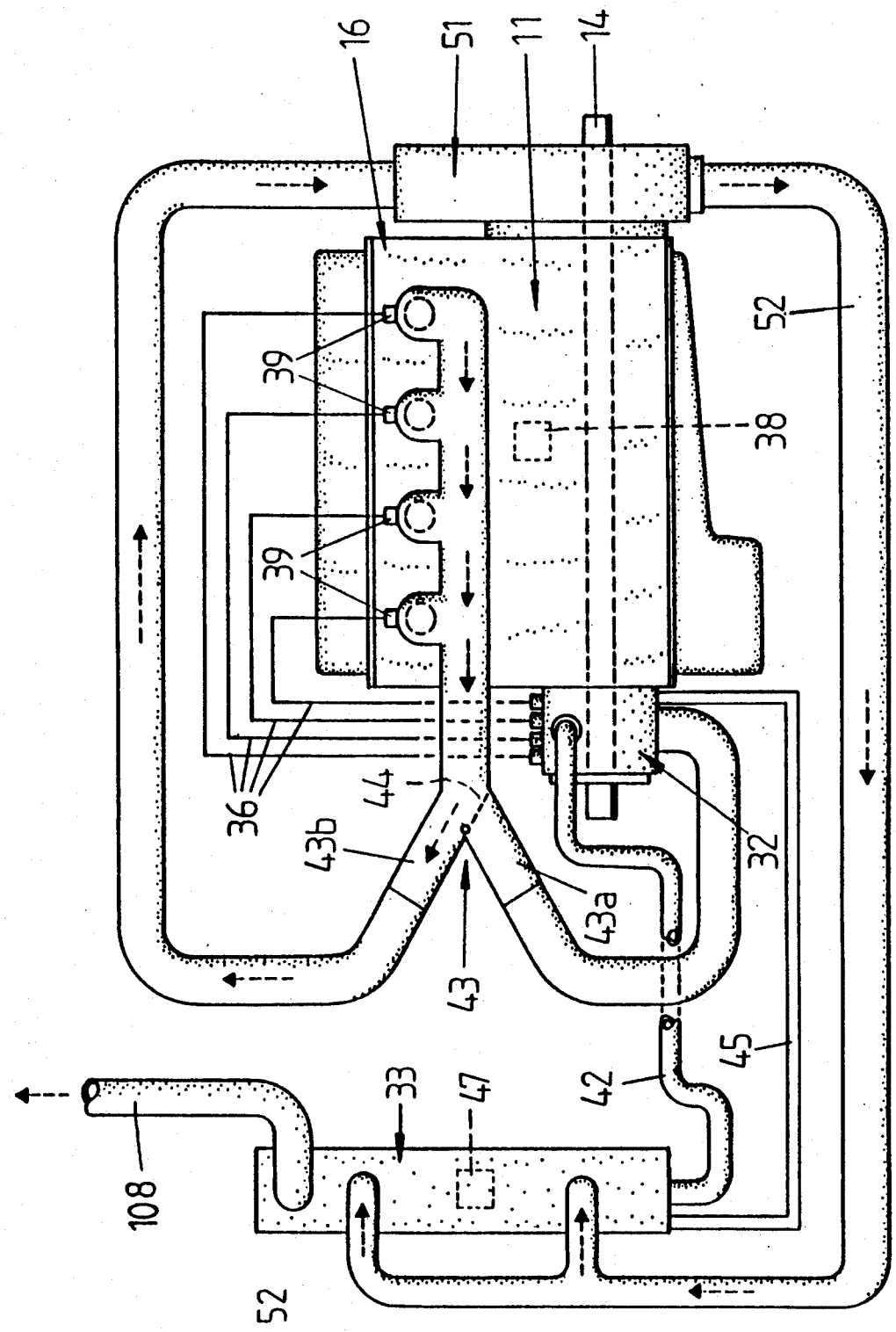
FIG. 6 is a schematic of the first embodiment of my hybrid internal combustion engine showing the route of flow of the column of pressurized exhaust/steam during normal operation of the engine.

When the temperature is above the designated setting of the thermostat 47, the valve remains in a normal operating position shown in FIG. 6. Exit conduit 43b directs the exhaust/steam to the power take-off system of the engine.

In the embodiment of my hybrid engine shown in the schematic FIGS. 5–7, the exit conduit 43b is connected to the entrance of a steam turbine 51 attached to the engine crankshaft 14. The steam turbine 51 may be positioned on the crankshaft 14 so the pressurized column of exhaust/steam is directed into the turbine 51 in such a way as to turn the crankshaft 14 in the same direction as its normal operation augmenting the rotational motion of the crankshaft 14. The turbine 51 further is in communication with a low pressure exhaust line 52 which is connected to the tank condenser 33. Spent exhaust/steam exiting the turbine 51 is directed to the tank condenser 33. The exhaust/steam is condensed within the water of the condenser 33 to resupply the reservoir therein.

Another embodiment of my invention is shown in FIGS. 8–14 and is utilized to operate and power a vehicle. The vehicle could be any vehicle that utilizes a gear box and gear shift lever to selectively transmit the rotational motion of the crankshaft 14 to drive wheels 84 propelling the vehicle on the road. The vehicle may or may not utilize the typical transmission and differential gears that transmit the rotational motion of the crankshaft 14 to the drive wheels 84. In addition, the vehicle includes a steering column to control the steering operation of the vehicle.

As the vehicle is illustrated from the schematic in FIGS. 8–14, the exit tube 43 is connected to the entrance of a high pressure collection tank 53. A third spring-loaded pressure activated one-way valve 54 is mounted within the exit conduit 43 proximal the entrance of the collection tank 53 and positioned so as to prevent any of the exhaust/steam entering the tank to back flush into the conduit 43. The spring-loaded one-way valve 54 may be the type used in the exhaust port 19 of the engine and injection port of the exhaust manifold 31. The tank 53 is constructed of material resistant to acid and alkaline corrosion and is sufficiently durable to withstand the anticipated heat and pressure from the exhaust/steam. The pressure tank 53, further, has five exit orifices having exit conduits connected thereto to carry exiting exhaust/steam from the tank 53 to the condenser 33 or a wheel steam turbine 63 mounted on each drive wheel 84. The first exit conduit is the neutral exit conduit 56. Access to the neutral exit conduit 56 is controlled by the solenoid activated open/shut control valve 56a. Valve 56a is activated to open by electrical connection to the neutral position of the gear shift lever. Valve 56a is activated to close by electrical connection to either the forward or reverse position of the gear shift lever. Exit conduit 56 is split in its forward traverse into a continuation of exit line 56 and exit conduit 56d at Y-yoke 56b by electromagnetically controlled valve 56c. Valve 56c is controlled to open to line 56 by temperature sensor 47 at or below its near freezing setting. Thus, when the vehicle is in neutral and the temperature within the tank condenser is near freezing or below, the hot exhaust is directed via line 56 through the water injector shroud and on into the internal array of piping 107, FIG. 17, within the tank condenser via line 45, heating the water or ice within the tank condenser.

Conversely, when the gear shift lever is in neutral and the temperature within the tank condenser is above its near freezing setting, valve 56c directs the exhaust/steam via conduit 56d and line 52 into the perforated tubing 103, FIG. 17, where it is bubbled up through the water-filled portion of the tank condenser 33 and exits the top of the tank condenser 33, FIG. 17, via the exhaust pipe 108, FIG. 17, to the atmosphere.

The other four exit conduits 57 are highly pressurized tubing that carry the hot exhaust/steam to each wheel steam turbine 63. Each pressurized exit conduit 57 attaches to a forward 63a and reverse portal 63b of the wheel steam turbine 63 through a Y-yoke, as further shown in FIGS. 8–14. As illustrated in FIGS. 8–14, the direction of the flow of exhaust/steam from the collection tank 53 is controlled by a series of electric motor and electromagnetically driven directional control valves 62 and 64. The control valve 62 is similar in design to the diverter valve 41.

A neutral control valve 56a is mounted within the collection tank 53 adjacent the exit orifice to the neutral exit conduit 56 and a turbine control valve 62 mounted within each Y-yoke to the wheel steam turbine 63. Each directional control valve 56a and 62 is remotely activated by the position of the gear lever.

The operation of the valves 56a and 62 is shown in FIGS. 8–14. The circuitry to each turbine control valve 62 may include a switch mounted to the gear that moves concomitantly with the gear lever (not shown) to open and close the circuit to each valve 56a and 62. When the gear lever is in the neutral position, the electric circuit to the neutral control valve 56a is closed energizing the electromagnet which activates the valve 56a to an open position so the column of exhaust or exhaust/steam is permitted to exit the collection tank 53 through the neutral exhaust conduit 56 and from there through one of the two alternate routes back to the tank condenser 33 as controlled by temperature sensor 47 through diverter valve 56c. When the gear lever is in forward or reverse, the circuit to the neutral control valve 56a is opened and no signal is relayed to the electromagnet, and the diverter valve 56a remains in a closed position forcing the exhaust/steam to exit through the other four exit conduits 57 and on to the wheel steam turbines 63.

Figure 11:
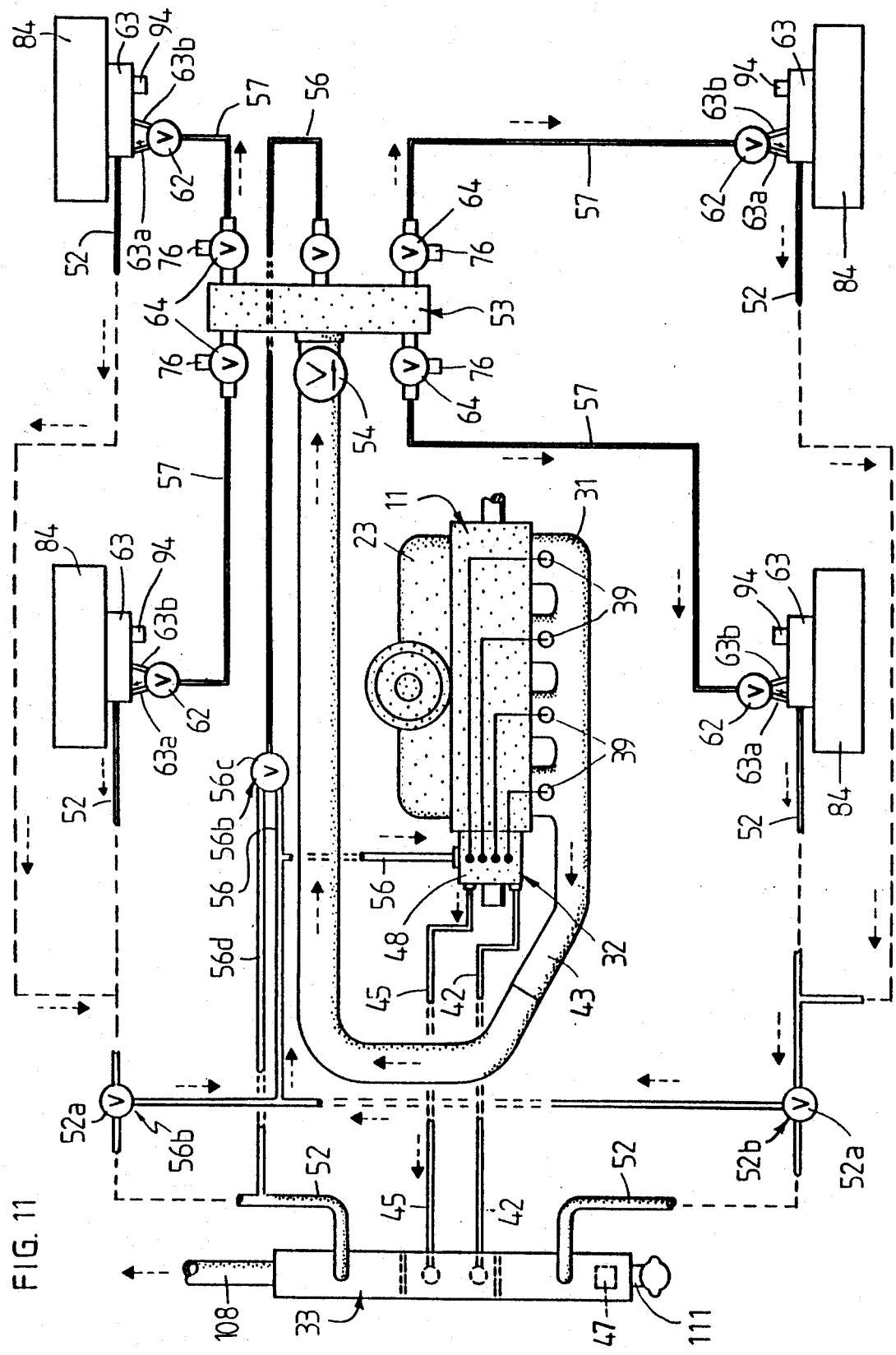
FIG. 11 is a schematic of the second embodiment showing the route of flow of the column of exhaust when the water in the tank condenser is frozen and the "gear shift" lever is forward.
Figure 12:
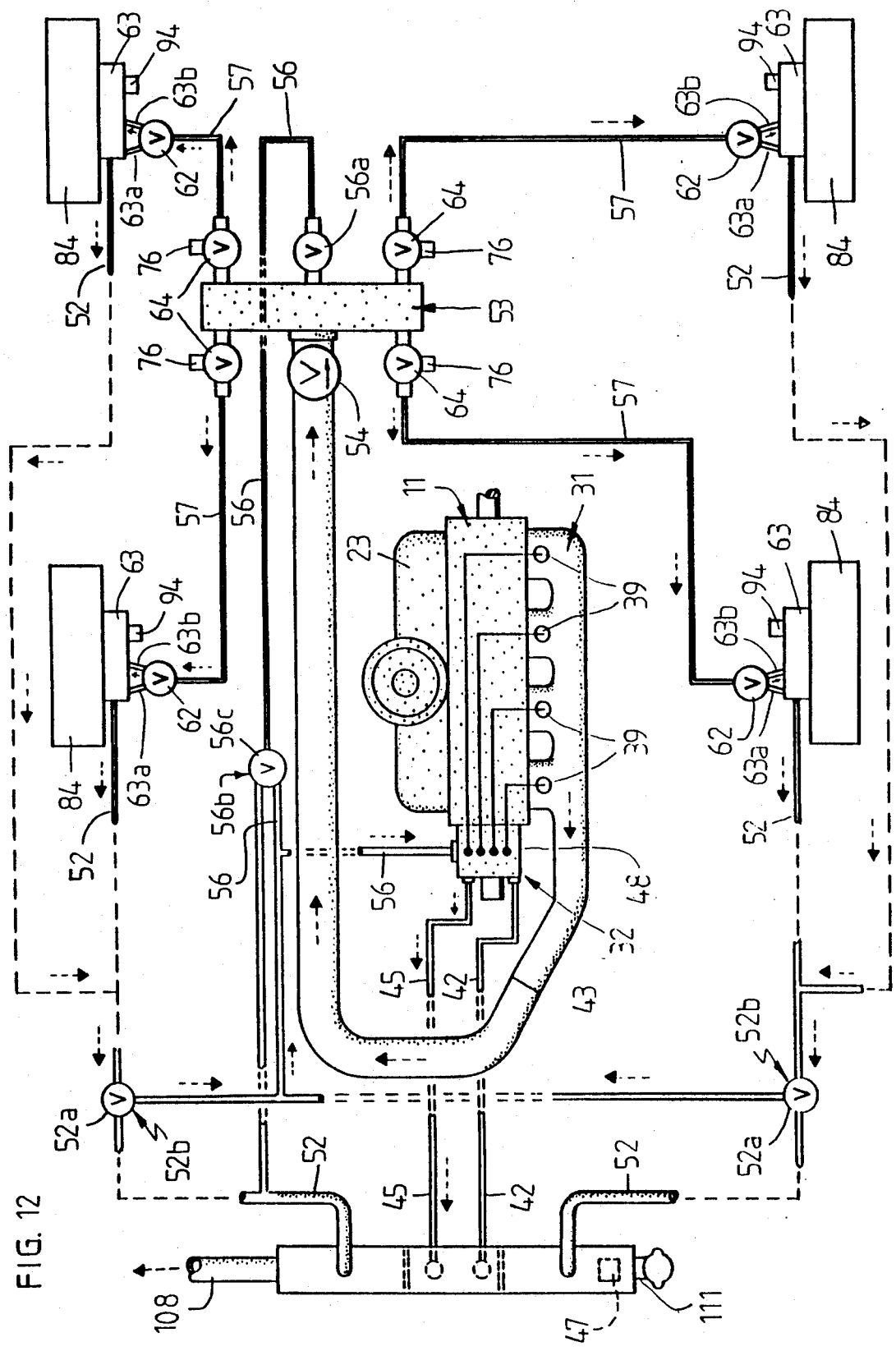
FIG. 12 is a schematic of the second embodiment showing the route of flow of the column of exhaust/steam when the water in the tank condenser is frozen and the "gear shift" lever is in reverse.
Figure 13:
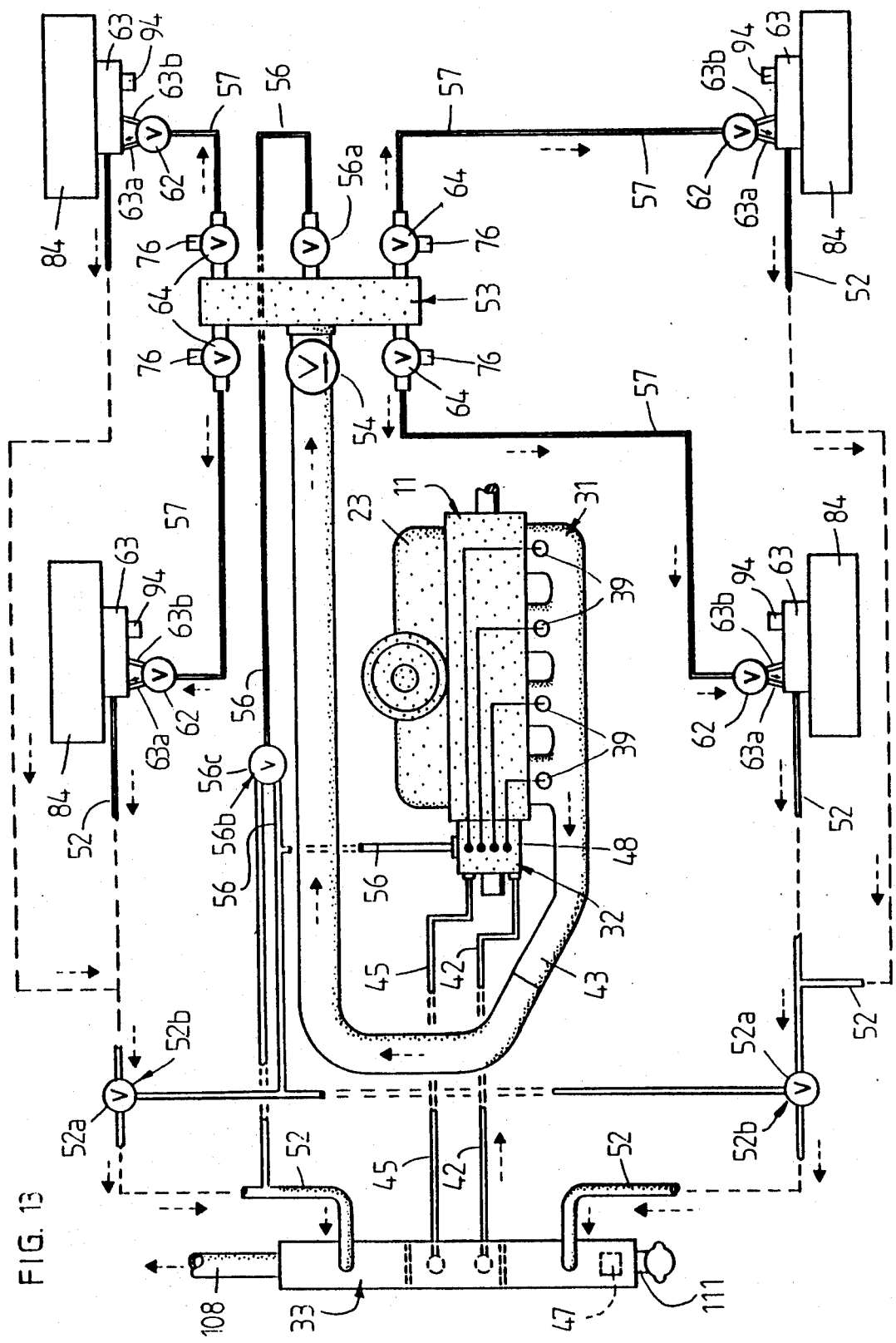
FIG. 13 is a schematic of the second embodiment showing the route of flow of the column of exhaust/steam when the water in the tank condenser is well above freezing and the "gear shift" lever is in forward—i.e., normal operation.
Figure 14:
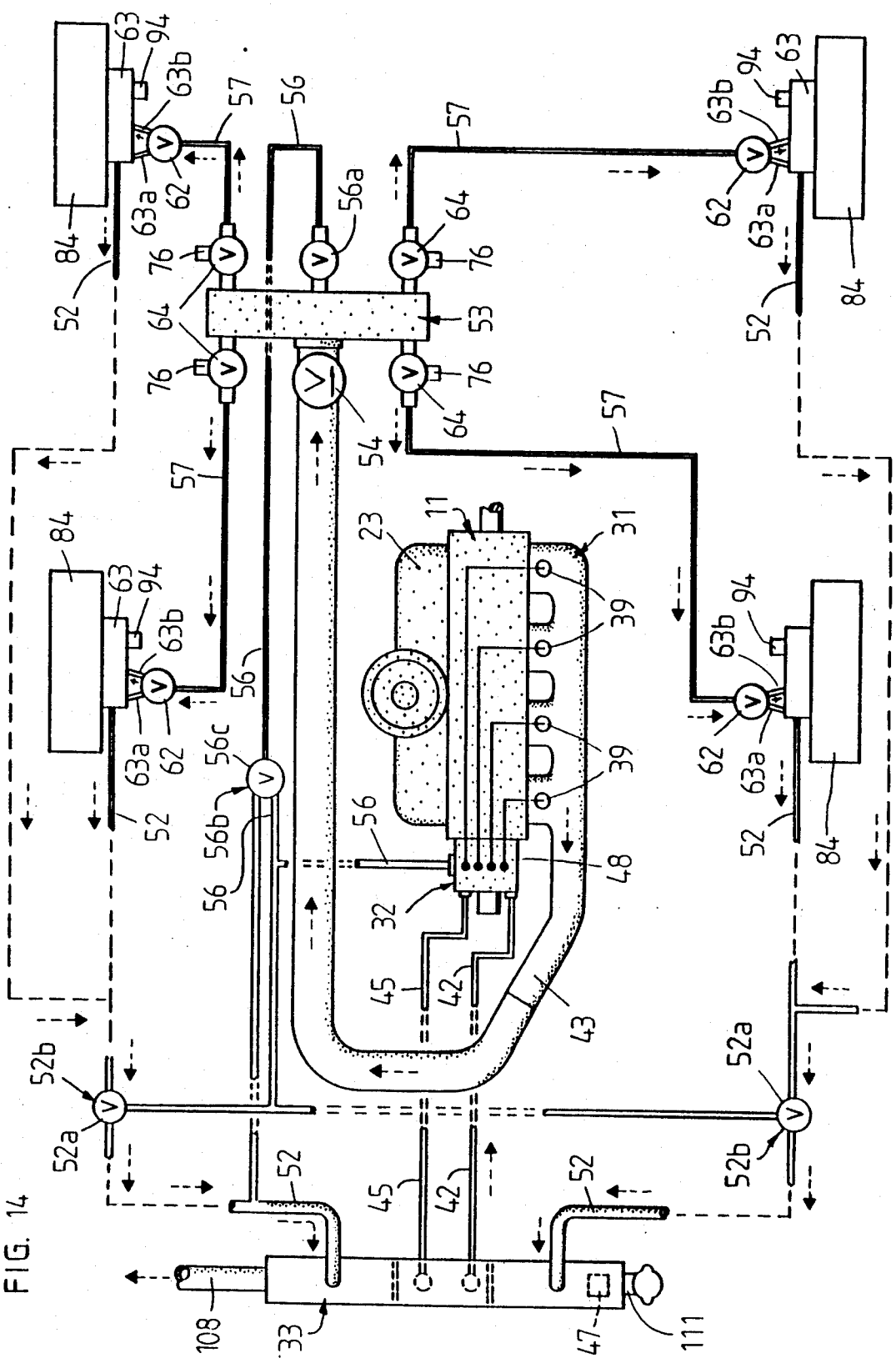
FIG. 14 is a schematic of the second embodiment showing the route of flow of the column of exhaust/steam when the water in the tank condenser is well above freezing and the "gear shift" lever is in reverse—i.e., normal operation.

As shown further in FIGS. 11 and 13, when the gear lever is placed in the forward position, the circuit to each steam turbine control valve 62 is opened, and the turbine valve 62 remains in a position that permits passage of the exhaust/steam into the forward entrance port 63a of the wheel turbine 63 rotating the drive wheels in a forward direction. Moreover, as in FIGS. 12 and 14, when the gear lever is placed in reverse, a circuit to the turbine valve 62 is closed energizing the electromagnet to actuate the turbine valve 62 so the exhaust/steam is directed to pass through the reverse port 63b of the wheel turbine 63 to rotate the drive wheels 84 in a reverse direction.

Figure 15:
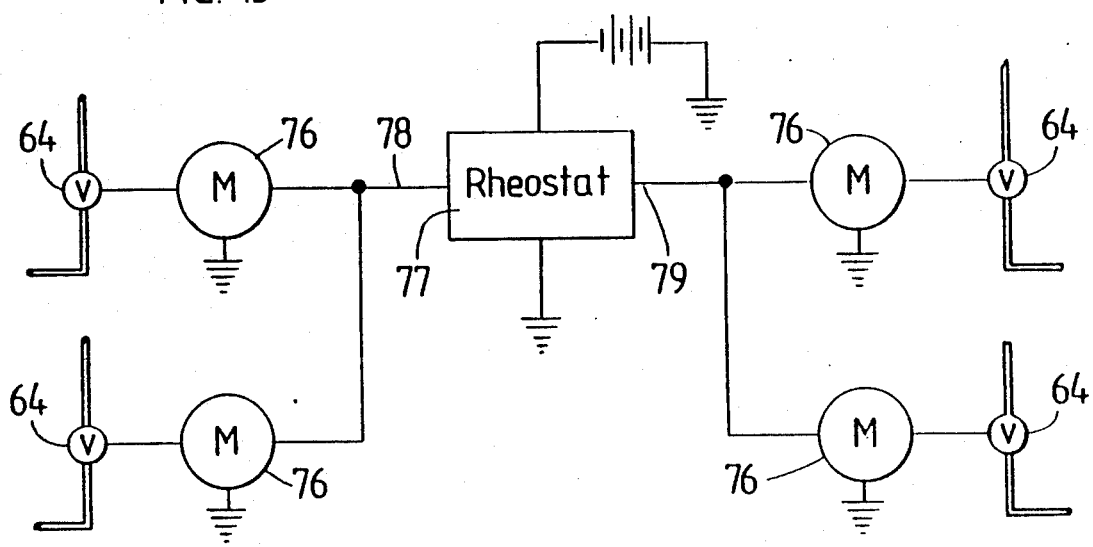
FIG. 15 is a circuitry schematic of the volume control valves.

The rotational speed of each drive wheel is controlled by regulating the volume of steam entering each wheel turbine 63. As shown in FIGS. 8–14, a volume control valve 64 is mounted within each pressurized exit conduit 57 proximal an exit orifice of the collection tank 53 and serves to selectively regulate the volume of steam to be directed to each wheel turbine 63. The volume control valves 64 are similar to those types of variable orifice valves used in flow regulators in water and natural gas lines. Each volume control valve 64 is controlled by an electric motor 76 that receives power from the car battery or alternator. The electric motor may be a stepper motor which obeys control signals supplied thereto to move by an exact amount adjusting the volume control valves 64 in accordance therewith. As further shown in FIG. 15, the circuit to the volume control valves includes a rheostat 77 whereby the closure of each volume control valve 64 is directed by the selected analog output of the rheostat 77.

The rheostat 77 is a multi-terminal rheostat that forms virtually a complete circle and is mounted within the steering column perpendicular to the longitudinal axis thereof. A first take-off circuit begins from a left end terminal 78 of the rheostat 77 and supplies a current to each electric motor 76 on the left side of the vehicle. A second take-off circuit begins from the right end terminal 79 and supplies a current to the electric motors 76 on the right side of the vehicle. A mid-contact terminal is centrally aligned on the apex of the rheostat 77. The movable contact terminal of the rheostat 77 is connected to the steering column whereby the movable contact terminal rotates about an axis concomitantly with the rotation of the steering column reflecting the degree of turn thereof.

When the steering column is held-straight, the movable contact terminal is in contact with mid-contact terminal of the rheostat 77, and the voltage dropped across each electric motor 76 is equal. Each of the four electric motors 76 is preset to adjust its variable orifice valve 64 to a medial open position whereby the volume of exhaust/steam supplied to each wheel air turbine is equal, so the vehicle may be driven in a straight line.

As the vehicle makes a right turn, the wheels on the left side of the vehicle must traverse a turning radius of a larger circle than the wheels of the right side of the vehicle. The left or outside wheels must rotate faster than the inside or right wheels so the vehicle may properly complete the turn. As the steering column is rotated to the right, the movable contact terminal of the rheostat 77 is rotated concomitantly therewith, thereby increasing the current supplied to each electric motor 76 on the right side of the vehicle. Each electric motor 76 on the right side of the car may be preset to respond to the increased voltage by selectively closing the variable orifice valves 62 in accordance with the increased voltage. The partial closure of the right side valves reduces the volume of exhaust/steam entering the right side turbines thereby reducing the rotational speed of the right side drive wheels.

In addition, as the movable contact terminal is rotated to the right, the current supplied to the electric motors 76 on the left side of the car is reduced. The electric motors 76 are preset to respond to the decrease in voltage by selectively opening the left side variable orifice valves in accordance with the decrease in the voltage. The volume of steam to each left side wheel air turbine 63 is increased causing the left side drive wheels 84 to rotate faster permitting the car to properly complete the turn. Thus, when a vehicle is steered into a turn, the valves 64 will be adjusted to a degree proportional to the radius of the arc traversed by each wheel. Inasmuch as the outside wheels must travel a greater distance, since they are traversing a larger arc of the same radian, the variable control valves 64 will be adjusted so a greater volume of steam will be supplied to the outside wheel turbines than to the inside wheel turbines. In a straight line driving situation, all the variable control valves 64 would be adjusted to a medial position allowing the same volume of exhaust/steam to enter each wheel turbine 63.

Figure 16:
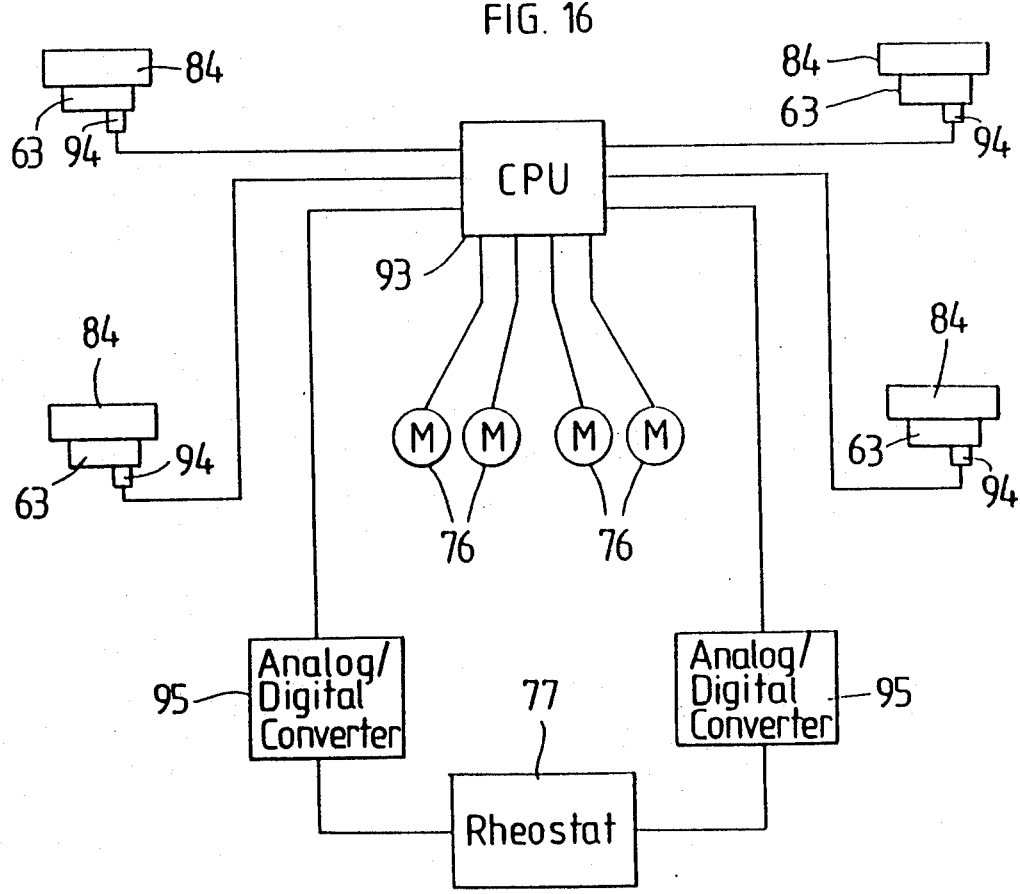
FIG. 16 is a schematic of my apparatus including wheel sensors of the volume control valves.

Inasmuch as wheels often loose traction, due to worn treads, ice, water, etc., one of the wheels may rotate and spin faster than other wheels causing the vehicle to spin out of control. My apparatus may further be modified by having a means to continuously monitor and adjust the drive wheel speed. As further represented in the schematic of FIG. 16, a central processing unit 93 having a microprocessor equipped with a programmable database receives the analog output of the rheostat 77. The microprocessor further has an analog/digital converter 95 to change the analog electrical output of the rheostat to digital input. The database is programed to respond to the digital input by identifying the degree of turn and computing the optimal safe rotational speed of each drive wheel, appropriate for the degree of the arc traversed by each drive wheel 84. This data is stored in the microprocessor.

In addition a wheel sensor 94 is mounted adjacent each drive wheel 84. The sensor 94 is in electrical communication with the central processing unit 93. The sensor 94 may be a LED or magnetic detection device. Each drive wheel 84 is provided with a physically detectable anomaly as a reflective surface or magnetic anomaly depending on the type sensor used. The wheel sensor 94 generates an electrical impulse signal indicative of the position of the anomaly as it passes a fixed reference. The electrical impulses are relayed to the microprocessor of the central processing unit 93 which converts the analog impulses to digital input. The database utilizes the input to compute the actual rotational speed of each drive wheel 84. The data is compared to the stored data representing the optimal safe speed of each drive wheel 84. If the data representing the actual speed of the wheel is not in accordance with optimal safe speed of the wheel, an electrical signal is relayed directly to the electric motor 76 to readjust the volume control valve 64. The data from the rheostat 77 and each wheel sensor 94 is continuously relayed to the microprocessor thereby continuously upgrading the database of the microprocessor. The central processing unit 93 provides for an effective anti-skid control and assures traction to the remaining drive wheels 84 should even three of four of the wheels 84 loose traction.

With reference to FIG. 17, the exhaust/steam spent in the air turbines is directed via low pressure tubing 52 to the tank condenser 33. As mentioned earlier, a hot column of exhaust/steam is also directed into the condenser when the temperature of the water in the condenser is near freezing. The water tank condenser 33 will be constructed of a good heat-conducting, acid- and alkali-resistant material. The liquid capacity of the water tank condenser 33 will be of an appropriate amount relative to the size of the engine.

As illustrated in FIG. 17, the tank condenser has a lower water-storage area 96 and upper air-filled area 97. Two internal baffles 98 will be placed within the bottom of the tank so as to create a small central compartment 99, flanked by two lateral compartments 101 through which the spent exhaust/steam from air turbines is bubbled. The two internal baffles 98 are perforated by numerous small holes in the upper two-thirds of their span.

The water tank condenser 33 has two tubular openings 102 in top of the condenser 33 above each lateral compartment for the entrance of the spent exhaust/steam via the low pressure tubing 52. The low pressure exhaust steam line 52 exiting the turbine 62 runs to a point above water level in the tank condenser 33 before dropping and entering the bottom of the tank to prevent water from drawing back into the low pressure line 52 and into the turbine itself. In actual construction, this line will enter the top of the tank and descend to the bottom of the tank and vent through a perforated horizontal tubing 103 in the bottom of the tank. The tubing 52 descends into the tank venting into a perforated vent tube 103 attached to the bottom of each lateral compartment 101. The column of exhaust/steam descending tubes 52 is broken into numerous small bubbles in exiting the finely perforated vent tube 103. This vastly increases the surface area of the column of exhaust/steam that contacts the water in the tank condenser 33 and aids in the condensation of the steam. It also aids in the dissolution of harmful combustion by-products and their retention within the water of the tank condenser 33.

The bottom of the small central compartment has a drain stop 104 and an exit tube 42 connected to the water injector 32. The bottom of the small central compartment 99 further has an entrance for the first exit conduit 45 which communicates with an internal array of good heat-conducting piping 107 that is arrayed through all three compartments of the tank condenser 33 and vents within the water tank condenser 33 above the water storage area 96 of the tank condenser. Thus, as a hot column of pressurized exhaust is diverted through the conduit 45 and array of heat-conducting pipe 107 of the condenser 33, the hot exhaust heats the water or ice therein.

The upper air-filled portion 97 of the water tank condenser 33 has an exhaust exit tube 108 that is connected to an exhaust pipe, muffler, tail-pipe, sequence of tubing 109 and vents the exhaust/steam into the atmosphere. The upper air filled area of the water tank condenser 33 may further have an entrance tube 111 with a sealing cap at the height of the top of the internal baffles 98 to serve as a water-filler tube. This entrance tube will be placed conveniently on the side of the lateral compartment opposite the exhaust exit tube.

While I have shown my invention in two forms, it will be obvious to those skilled in the art that it is not so limited but is susceptible of various changes and modifications without departing from the spirit thereof.

What I claim is:

1. A hybrid internal combustion/steam engine having a plurality of cylinders with pistons therein connected to a crankshaft, comprising in combination therewith:
   (a) means for introducing a combustible fuel/air mixture into each cylinder of said plurality of cylinders for combustion to provide a power stroke for the piston;
   (b) a plurality of exhaust ports each connected to and in communication with a cylinder of said plurality of cylinders, such that exhaust combustion gases are discharged through selected ones of said plurality of exhaust ports during an exhaust stroke of said piston;
   (c) a steam generator connected to and in communication with each exhaust port having a water injection port therein proximal the exhaust port of each cylinder;
   (d) means for selectively injecting a predetermined volume of water proximal the exhaust port of selected cylinders concurrently with the end of the exhaust stroke and the end of the compression stroke of pistons associated with said selected cylinders such that the volume of water contacts the exhausted combustion gases and is substantially vaporized into a pressurized volume of steam within said steam generator;
   (e) means for allowing exhaust combustion gases into said steam generator from said exhaust port of said cylinder and means to prevent steam generated in said steam generator from reentering said cylinder; and
   (f) a pressurized steam powered take off means connected to and in communication with said steam generator for converting said exhaust combustion gases into a usable power source.

2. An internal combustion/steam engine as defined in claim 1 wherein said power take-off means includes a steam turbine mounted to the engine crankshaft to augment the rotational motion thereof.

3. An internal combustion/steam engine as defined in claim 1 wherein said engine is a drive unit for a vehicle having a manually selectable gear box, at least two drive wheels and a steering column, said power take-off means comprising:
   (a) a compression tank connected to and in communication with said steam generator for receiving said pressurized column of steam therefrom for storage, wherein said steam is selectively released from said compression tank at superatmospheric pressures and introduced into selected steam turbines connected to said drive wheels for augmenting the rotation thereof;
   (b) means for selectively controlling the flow of pressurized steam from said compression tank in accordance with the selected operation of said gear box; and
   (c) means for selectively governing the rotational speed of each said drive wheel responsive to the arcuate path traveled thereby.

4. An internal combustion engine as defined in claim 3 wherein said rotational speed governing means comprises:
   (a) a volume control valve mounted intermediate each steam turbine and the compression tank; and
   (b) means for actuating said volume control valve in accordance with the degree of rotation of said steering column.

5. An engine as defined in claim 4 wherein said engine further includes a means in electrical communication with said actuating means for continuously monitoring the rotational speed for each drive wheel to control the actuating means.

6. A combustion engine as defined in claim 1 wherein said water injecting means comprises a water injector pump having a number of outlets connected to said water injection ports in the steam generator.

7. A hybrid internal combustion/steam engine having a plurality of cylinders with pistons therein connected to a crankshaft, comprising in combination therewith:
   (a) means for introducing a combustible fuel/air mixture into each cylinder of said plurality of cylinders for combustion to provide a power stroke for the piston;
   (b) a plurality f exhaust ports each connected to and in communication with a cylinder of said plurality of cylinders, such that exhaust combustion gases are discharged through selected ones of said plurality of exhaust ports during an exhaust stroke of said piston;

(c) a steam generator connected to and in communication with each exhaust port having a water injection port therein proximal the exhaust port of each cylinder;

(d) means for selectively injecting a predetermined volume of water proximal the exhaust port of selected cylinders concurrently with the end of the exhaust stroke and the end of the compression stroke of pistons associated with said selected cylinders such that the volume of water contacts the exhausted combustion gases and is substantially vaporized into a pressurized volume of steam within said generator;

(e) a first pressure activated one-way valve mounted within the cylinder exhaust port operable to open when combustion gases are exhausted from said cylinder and operable to close when steam is subsequently generated in said steam generator;

(f) a second pressure activated one-way valve mounted in each water injection port operable to open due to pressure from the predetermined volume of water in the line and operable to close upon subsequent generation of steam in said steam generator; and (g) a pressurized steam power take-off means connected to and in communication with said steam generator for converting said exhausted combustion gases into a usable power source.

8. An internal combustion engine as defined in claim 7 wherein said power take-off means includes a steam turbine mounted to the engine crankshaft to augment the rotational motion of said crankshaft.

9. An internal combustion engine as defined in claim 7 wherein said engine is a drive unit for a vehicle having a manually selectable gear box, at least two drive wheels and a steering column, said power take-off means further comprising:

(a) a compression tank connected to and in communication with said steam generator for receiving said exhausted combustion gases therefrom for storage, wherein said gases are selectively released from said compression tank at superatmospheric pressures and introduced into selected steam turbines connected to said drive wheels for augmenting the rotation thereof;

(b) means for selectively controlling the flow of pressurized gases from said compression tank, in accordance with the selected operation of said gear box; and (c) means for selectively governing the rotational speed of each said drive wheel responsive to the arcuate path traveled thereby.

10. An internal combustion engine as defined in claim 9 wherein said rotational speed governing means comprises:

(a) a volume control valve mounted intermediate each gas turbine and said compression tank; and (b) means for selectively actuating said valve in accordance with the degree of rotation of said steering column.

11. An engine as defined in claim 10 wherein said engine further includes means associated with said actuating means for continuously monitoring the rotational speed for each drive wheel to control said actuating means.

12. An engine as defined in claim 1 further including a condenser means in communication with said water injecting means, said steam generator and said power take-off means.

13. A hybrid internal combustion/steam engine having a plurality of cylinders with pistons therein connected to a crankshaft comprising in combination therewith:

(a) means for introducing a combustible fuel/air mixture into each cylinder of said plurality of cylinders for combustion to provide a power stroke for the piston;

(b) a plurality of exhaust ports each connected to and in communication with a cylinder of said plurality of cylinders, such that exhaust combustion gases are discharged through selected ones of said plurality of exhaust ports during an exhaust stroke of said piston;

(c) a steam generator connected to and in communication with each exhaust port having a water injection port therein proximal the exhaust port of each cylinder;

(d) means for selectively injecting a predetermined volume of water proximal the exhaust port of selected cylinders concurrently with the end of the exhaust stroke and the end of the compression stroke of pistons associated with said selected cylinders such that the volume of water contacts the exhausted combustion gases and is substantially vaporized into a pressurized volume of steam within said steam generator;

(e) a pressurized steam power take-off means connected to and in communication with said steam generator for converting said exhausted combustion gases into a usable power source; and (f) means for selectively diverting the flow of exhaust combustion gases from said power take-off means to a condenser means in accordance with the temperature of water therein.

14. An engine as defined in claim 13 wherein said diverting means include a flow control valve adjacent said steam generator.

15. An engine as defined in claim 13 wherein said condensing means includes a condenser tank having a lower water-storage area into which condensed water from said power take-off means and steam from said steam generator is directed with said lower water-storage area communicating with the water injecting means to supply water thereto, and an upper portion having an exit port for escaping combustion gases.

16. An engine as defined in claim 15 wherein said condenser tank further comprises:

(a) two internal baffles vertically mounted within the bottom of the tank dividing the lower water-storage area into a central compartment in communication with said water injecting means and said steam generator, and an exhaust-intake compartment on either side of said central compartment communicating with said power take-off means; and (b) an internal array of heat conducting tubing connected to the steam generator passing through the lower water storage area terminating in the upper air-filled portion of tank to allow the steam to vent through said exit port.

17. An internal combustion engine as defined in claim 16 wherein said engine is a drive unit for a vehicle having a manually selectable gear box, at least two drive wheels and a steering column, and said gas driven transmission (a) a compression tank connected to and in communication with said steam generator for receiving exhaust combustion gases therefrom for storage, wherein said gases are released from said tank at superatmospheric pressure and introduced to selected steam turbines connected to said drive wheels;

(b) means for selectively controlling the flow of pressurized gases from said compression tank, in accordance with the selected operation of said gear box; and (c) means for selectively governing the rotational speed of each drive wheel in accordance with the arcuate path traveled thereby.

18. An internal combustion engine as defined in claim 17 wherein rotational speed regulating means comprises:

(a) a volume control valve intermediate each steam turbine and the compression tank; and (b) means for selectively actuating said volume control valve in accordance with the rotation of said steering column.

19. An engine as defined in claim 18 wherein said engine further includes a means associated with said rotational speed governing for continuously monitoring said drive wheel rotational speed.

20. A hybrid internal combustion engine having a plurality of cylinders with pistons therein connected to a crankshaft comprising:

(a) means for introducing a combustible fuel/air mixture into each cylinder of said plurality of cylinders to provide a power stroke for the pistons;

(b) an individual exhaust port associated with each cylinder of said plurality of cylinders for the discharge of combustion gases during an exhaust stroke of said piston;

(c) a steam generator in communication with the exhaust port of each cylinder having water injection port thereon adjacent said exhaust port of each said cylinder;

(d) means for injecting a predetermined volume of water adjacent the exhaust port of each cylinder concurrently with the end of the exhaust stroke and of the compression stroke of each piston such that the volume of water contacting the exhausted combination gases is substantially vaporized to steam forming a pressurized volume of steam within said steam generator;

(e) means for allowing exhausted combustion gases into said steam generator from exhaust port of said cylinder and means for preventing steam generated in said steam generator from reentering said cylinder;

(f) a pressurized exhaust/steam power take-off means in communication with said steam generator to rotate at least one steam turbine.

21. A combustion engine as defined in claim 20 wherein said water injecting means comprises a water injector pump receiving water from a remote source and having an equal number of orifices as injection ports in said steam generator such that each said orifice is connected to a water injection port in the steam generator.

22. A hybrid internal combustion/steam engine having a plurality of cylinders with pistons therein connected to a crankshaft, comprising in combination therewith:

(a) means for introducing a combustible fuel/air mixture into each cylinder of said plurality of cylinders for combustion to provide a power stroke for the piston;

(b) a plurality of exhaust ports each connected to and in communication with a cylinder of said plurality of cylinders, such that exhaust combustion gases are discharged through selected ones of said plurality of exhaust ports during an exhaust stroke of said piston;

(c) a steam generator connected to and in communication with each exhaust port having a water injection port therein proximal the exhaust port of each cylinder;

(d) means for selectively injecting a predetermined volume of water proximal the exhaust port of selected cylinders concurrently with the end of the exhaust stroke and the end of the compression stroke of pistons associated with said selected cylinders such that the volume of water contacts the exhausted combustion gases and is substantially vaporized into a pressurized volume of steam within said steam generator;

(e) a pressurized steam power take-off means connected to and in communication with said steam generator for converting said exhausted combustion gases into a usable power source;

(f) a first pressure activated one-way valve mounted within the cylinder exhaust port operable to open when combustion gases are exhausted from said cylinder and operable to close as steam is generated in the steam generator;

(g) a second pressure activated one-way valve mounted in each water injection port in said steam generator operable to open due to pressure of water from said water pump and operable to close upon subsequent formation of steam in said steam generator; and (h) a water injector pump receiving water from a remote source and having an equal number of orifices as injection ports in said steam generator such that each said orifice is connected to a water injection port in said steam generator.

23. A combustion engine as defined in claim 22 wherein said condensing means includes a condenser tank comprising a tank having a lower water storage area and an upper air-filled portion having an exit port for escaping combustion gases.

24. A combustion engine as defined in claim 23 wherein said condenser tank further comprises:

(a) two internal baffles vertically mounted within the bottom of the tank dividing the lower water-storage area into a central compartment and two lateral spent exhaust/steam intake compartments, with said central compartment connected to the water injector pump and the hot exhaust line and each said spent exhaust-intake compartments connected to low pressure tubing from said steam turbine; and (b) an internal array of heat conducting tubing connected to said first conduit means arrayed throughout the lower water storage area to heat the water therein and terminating in the upper air-filled portion of tank allowing the hot exhaust to vent through said exit port.

25. An internal combustion engine as defined in claim 22 wherein said power take-off means includes a steam turbine attached to the engine crankshaft to augment the rotational power of said crankshaft.

26. An internal combustion engine as defined in claim 22 wherein said engine is a drive unit for a vehicle having a manually selectable gear box, at least two drive wheels, a steering column and said power take-off means further includes:
  (a) a compression tank connected to and in communication with said steam generator, having a plurality of orifices with each said orifice connected to a pressurized hose that is joined to a wheel steam turbine mounted on each said drive wheel;
  (b) means for selectively diverting the flow of pressurized exhaust combustion gases exiting the compression tank in accordance with the selected operation of said gear box, through the neutral exhaust conduit to the collection tank means when the gear box selection is neutral and to said steam turbines when the gear box is activated; and
  (c) means for selectively governing the rotational speed of each said drive wheel in accordance with the turning radius traversed by said drive wheels.

27. An internal combustion engine as defined in claim 26 wherein said rotation speed regulating means comprises:
  (a) a volume control valve mounted proximal each said orifice of the compression tank activated by the rotation of said steering column; and
  (b) means for selectively actuating said valve in accordance with the degree of rotation of said steering column.

28. An engine as defined in claim 27 wherein said engine further includes a means for continuously monitoring and computing the appropriate drive wheel rotational speed for each drive wheel in electrical communication with said volume regulating means to direct the appropriate adjustment of each said volume control.

* * * * *